United States Patent [19]

Louis

[11] 4,390,205
[45] Jun. 28, 1983

[54] CONVERTIBLE SEAT FOR A MOTOR VEHICLE

[75] Inventor: Llorente Louis, Mantes-la-Ville, France

[73] Assignee: Regie Nationale des Usines Renault, Boulogne-Billancourt, France

[21] Appl. No.: 268,100

[22] Filed: May 28, 1981

[30] Foreign Application Priority Data

Jun. 3, 1980 [FR] France ................................ 80 12269

[51] Int. Cl.³ ............................................. A47C 13/00
[52] U.S. Cl. ...................................... 297/129; 296/66; 297/324; 297/334
[58] Field of Search ...................... 297/92, 94, 95, 100, 297/125, 129, 324, 334; 296/66, 65 R; 5/44 R, 47, 48

[56] References Cited

U.S. PATENT DOCUMENTS

| 2,926,948 | 3/1960 | Koplin et al. | 297/378 X |
| 2,926,949 | 3/1960 | Himka et al. | 297/125 X |
| 2,927,818 | 3/1960 | Ferrara | 297/125 X |
| 3,171,682 | 3/1965 | Buser et al. | 297/129 X |
| 3,311,405 | 3/1967 | Brennan et al. | 296/66 |
| 3,695,688 | 10/1972 | Wize . | |
| 3,703,310 | 11/1972 | Lystad | 296/66 X |

FOREIGN PATENT DOCUMENTS

| 4484 | 1/1979 | European Pat. Off. . |
| 1254712 | 1/1961 | France . |
| 194939 | 4/1923 | United Kingdom . |

Primary Examiner—William E. Lyddane
Attorney, Agent, or Firm—Oblon, Fisher, Spivak, McClelland & Maier

[57] ABSTRACT

A foldable rear seat for a motor vehicle is disclosed. A connecting bar which is pivoted to the seat portion and to the back portion has a first pivot axis below the plane P containing both the pivot axis connecting a connecting link member of the seat portion to the floor and the pivot axis connecting the connecting bar to the back portion. A guide ramp provides for guiding translatory movement of a point A of the connecting bar, for the purpose of raising the first axis above said plane.

4 Claims, 7 Drawing Figures

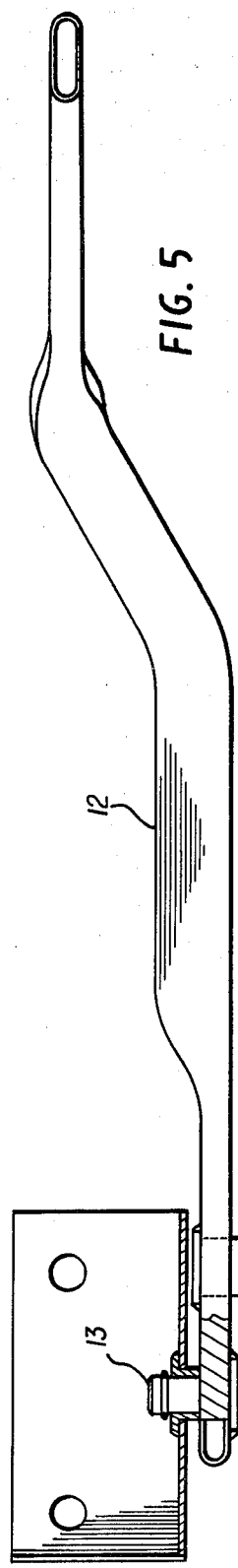
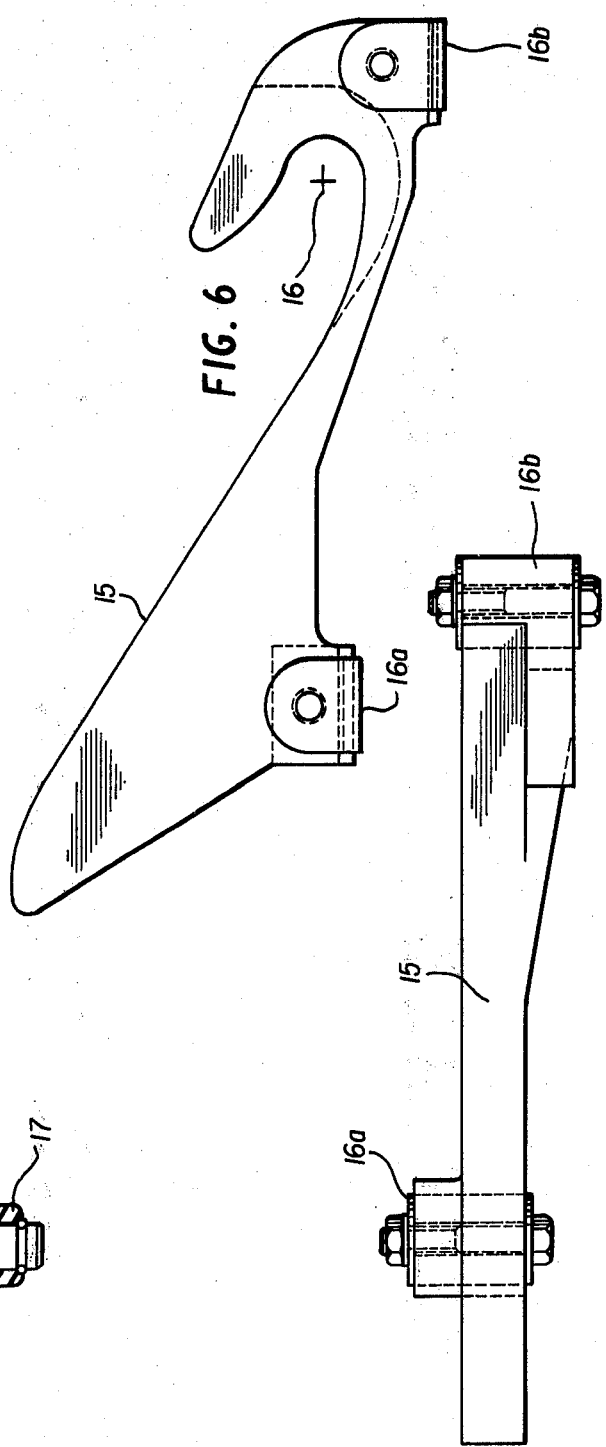

CONVERTIBLE SEAT FOR A MOTOR VEHICLE

BACKGROUND OF THE INVENTION

1. Field of the Invention

The invention relates to a convertible seat for a motor vehicle having a seat portion which can be raised and a back portion which can be folded down in simultaneous movements, which is used for increasing the useful volume of the luggage compartment.

For this kind of seat, use is made of a connecting bar which is pivotally connected to the seat portion and to the back portion for ensuring simultaneous movements of the back and seat portions.

2. Description of the Prior Art

In accordance with one prior art seat which is disclosed in French Pat. No. 2,420,445, a link member which is pivotally connected at one end to the floor of the vehicle about a transverse axis is connected by its other end to a second transverse axis member which is fixed to the seat portion, thus permitting the seat portion to be raised while the connecting bar is pivoted about a transverse axis member which is fixed with respect to the back portion and a transverse axis member which is fixed with respect to the seat portion.

When, in the position of use of the seat, the pivot axis of the connecting bar connecting it to the seat portion is below the plane defined by both the pivot axis of the link member connecting it to the floor and the pivot axis of the connecting bar connecting it to the back portion, the movement of folding down the back portion cannot be communicated to the seat portion. Conversely, the return movement of the back portion is not entirely communicated to the seat portion so that the latter cannot return to its initial position of use.

SUMMARY OF THE INVENTION

An object of the present invention is an improved seat which overcomes the above-mentioned disadvantages.

Another object of the invention is a seat design in which the pivot axis between the seat portion and the connecting bar is disposed at a very low level so that the latter cannot constitute any impediment which is harmful to the comfort of the seat.

The invention therefore applies to a convertible seat for a motor vehicle having a seat portion which can be raised upwardly about a first transverse axis, a back portion which can be folded down forwardly about a second transverse axis, a connecting bar which is pivoted to the seat portion and to the back portion to ensure simultaneous movements of said two components, a link member which is pivoted at its end to the first transverse axis and which is connected by its other end to a third transverse axis which is fixed to the floor of the vehicle. In the normal position of use of the seat, the pivot axis connecting the connecting bar to the seat portion is below the plane containing both the third pivot axis of the link portion, which axis is fixed to the floor of the vehicle, and the pivot axis connecting the connecting bar to the back portion. Further, at that time a guide ramp which is fixed with respect to the base structure of the seat portion provides guide for translatory movement of a point on the connecting bar for the purpose of raising the pivot axis connecting the connecting bar to the seat portion above said plane in the course of the folding movement of the back portion.

In the above-defined seat, the point of translatory movement of the connecting bar with the guide ramp is advantageously formed by a running roller which is temporarily in contact with the guide ramp mounted to the floor of the vehicle. The guide ramp also carries a housing for the spindle of said roller.

The seat preferably uses a system of two connecting bars which are respectively disposed in the vicinity of the lateral ends of the frames of the back portion and the seat portion. Such a seat is therefore particularly well suited to the different shapes of base structures for the seat portion and the floor, and does not give rise to particular problems in use in regard to the possible ways of producing proper folding movement and locking action with respect to the seat portion.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 5 is a plan view of the connecting bar provided with a roller and a bearing and a bracket for fixing it to the seat portion frame;

FIG. 6 is a side view of the guide ramp; and

FIG. 7 is a plan view of the ramp shown in FIG. 6.

DETAILED DESCRIPTION OF THE PREFERRED EMBODIMENTS

Figure 1:
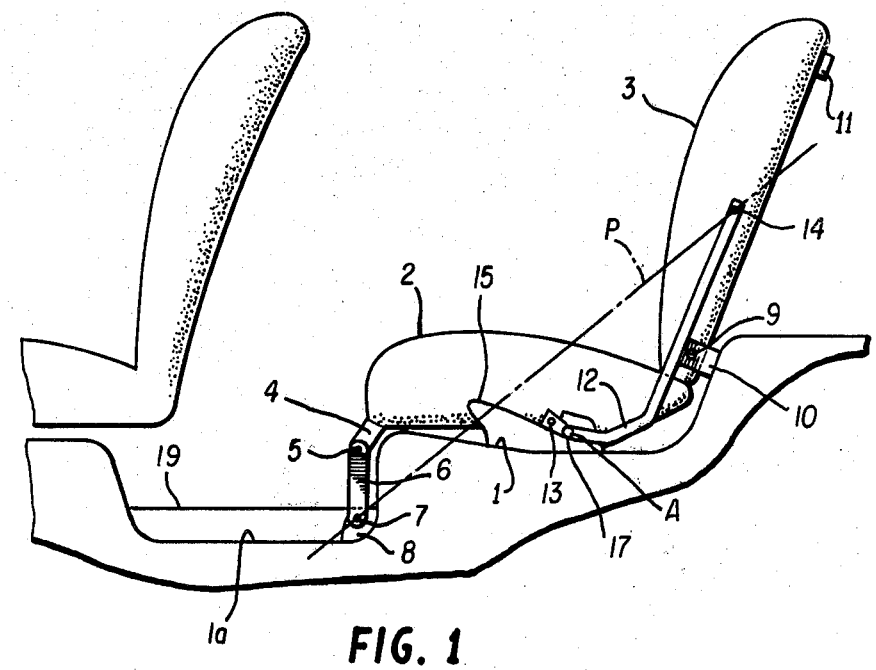
FIG. 1 is a side view of the seat according to the invention, in its normal position of use.

The Figures show a motor vehicle floor 1 supporting a rear seat which mainly comprises a seat portion 2 and a back portion 3.

The seat portion 2 rests on the floor 1 at a point towards the rear part of the seat portion. Below the front part thereof, the seat portion carries a fitting 4 which is pivoted to a first transverse axis 5 carried by one end of a link member 6 which is pivoted to a third transverse axis 7 carried by a bracket member 8 which is fixed to the floor 1. It is possible to provide one or two link members, which are disposed in the vicinity of the central part of the seat portion, or two link members which are each disposed at one lateral end of the seat portion.

At its base, the back portion 3 is pivoted about a second transverse axis 9 carried by a bracket member 10 which is fixed to the floor 1. In the normal position of use, the back portion bears, at its upper part, against abutments 11 which are fixed with respect to the body, and any suitable known lock mechanism can be used for locking the back portion in that position.

Provided on each side of the seat is a connecting bar 12 which is pivoted to the seat portion at 13 and to the back portion at 14. The bar 12 is bent, having its concave side directed upwardly, as shown in the drawings, so that it rests in the vicinity of the floor when the seat is in the position of use. Thus, it does not constitute any impediment, from the point of view of comfort, within the mechanism of the seat portion.

The rear of the seat portion 2 extends by a sufficient length below the base of the back portion 3 so as to avoid the formation of a gap or space between the two portions.

In order to complete the action of locking the seat portion 2 in the position of use, when the pivot axis 13 connecting the bar 12 to the seat portion 2 is below the plane P containing the third transverse axis 7 and the pivot axis 14 connecting the connecting bar to the back portion, a ramp-type guide 15 which is mounted by means of fittings 16a and 16b to the floor 1 or to the base structure or bottom of the seat portion 2 is provided. The ramp guide 15 which is a simple or double ramp, may be provided in the vicinity of the central part of the seat portion or disposed on the respective lateral sides of the frame of the seat portion, as stated above in relation to the connecting bars 12. The ramp guide 15 which is downwardly inclined rearwardly of the seat portion 2, as can be seen from FIGS. 6 and 7, opens into a housing 16 which receives the spindle or the cylindrical hub portion 17 of a running roller 18 in normal use. It will be noted that the housing 16 may be closed by a spring-loaded bolt member (not shown) which prevents the hub portion 17 from being accidentally removed from the housing.

Figure 2:
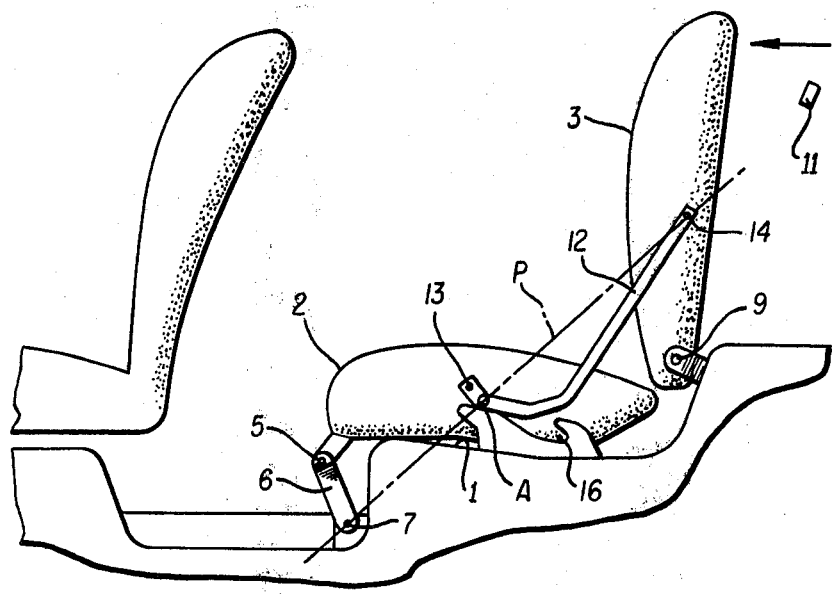
FIGS. 2 and 3 show the seat in intermediate positions.
Figure 4:
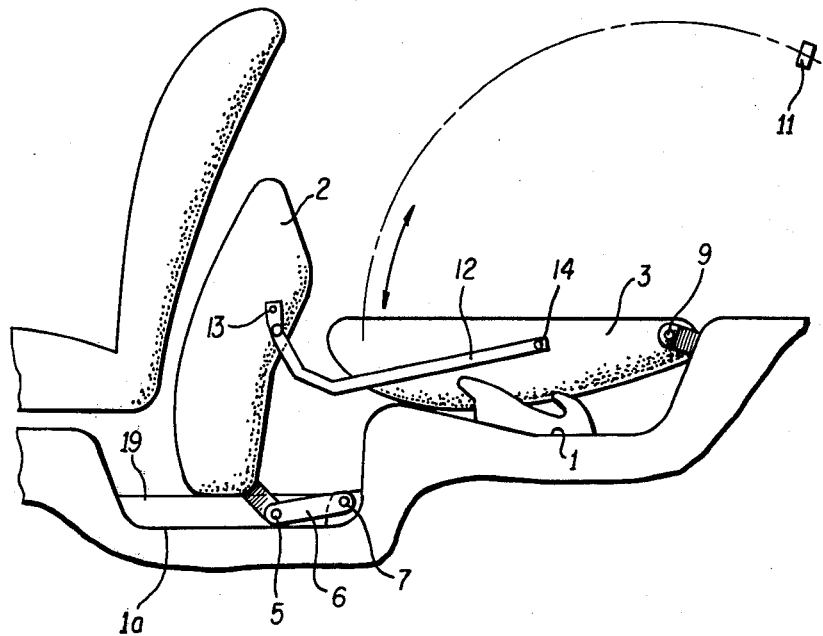
FIG. 4 is a view similar to that of FIG. 1 after complete conversion of the seat.

In this way, the guide ramp 15 provides a guide for translatory movement of an intermediate point A of the connecting bar 12, which is disposed in the vicinity of its pivot axis 13 to the seat portion 2. In order to complete the translatory movement of the point A in the direction of the plane P so as to cause it to pass above said plane, as shown in FIG. 2, it is sufficient, after the back portion has been unlocked, to apply a forward thrust force to its upper part in order to move the assembly into the final position shown in FIG. 4.

The different phases of movement of the seat are as follows:

In the first part of the forward movement of the back portion 3, the roller 18 rises along the ramp 15 as the connecting bar 12 pushes the seat portion forward which causes the link member 6 to pivot. During this phase of the operation, the seat portion is displaced forwardly with a movement which is close to the horizontal, which causes the rear of the seat portion to be smoothly disengaged from the base of the back portion (FIG. 2).

As the movement is continued, the link portion 6 continues to move forwardly and incline, which lowers the front part of the seat portion while its rear part, which slides on a raised part of the floor 1, is pushed upwardly; the raising movement of the seat portion is thus begun.

Figure 3:
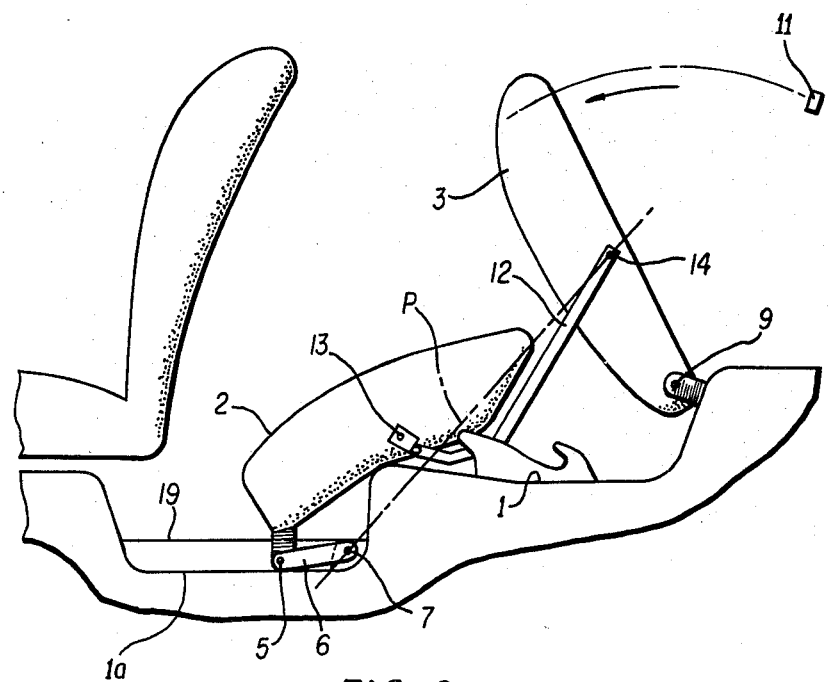

The rotary movement of the link member 6 is stopped when its end which carries the axis 5 bears against the part 1a of the floor 1. In this position (see FIG. 3), it will be seen that the pivot 13 is then clearly above the plane which joins the pivots 7 and 14. The operating movement can therefore continue, without the danger of jamming, into the position shown in FIG. 4.

It will be seen that the above-described arrangement properly fulfills the above-stated objects, this being achieved by virtue of the mobility of the pivot axis 13 of the connecting bar. In fact, it is such mobility which makes it possible to provide for disengagement of the seat portion in a forward direction and which makes it possible for the pivot 13 to be disposed at a relatively low level, while moving it to a position clearly above the line connecting the pivots 7 and 14 when the seat portion has moved into a position of bearing on the base structure 1a.

In the above-described example, it is assumed that the link member 6 was stopped by bearing against the floor 1. The same result would be obtained if the front of the seat 2 were to bear against a longitudinal rib portion 19 of the floor 1.

In a simplified alternative form of the invention, the pivot axis 13 and the axis of the roller 18 can be combined and merged. This alternative form may be used with advantage for certain vehicle floor configurations.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A convertible seat for a motor vehicle, movable between a normal position and a folded position, and comprising:
   a seat portion pivotable about a first transverse axis;
   a back portion pivotable about a second transverse axis;
   a link member having one end pivoting about a third transverse axis fixed to said vehicle and another end pivoting about said first transverse axis;
   a connecting bar pivoted to said seat portion at a fourth transverse axis and to said back portion at a fifth transverse axis, so as to ensure simultaneous movement of said seat and back portions; and
   a guide means fixed to said vehicle and contacting a portion of said connecting bar for guiding said portion of said connecting bar during movement of said seat portions;
   wherein said axes are positioned such that fourth axis is below a plane containing said third and fifth axes when said seat is in said normal position, and wherein said guide means is contoured to guide said fourth axis above said plane when said seat is moved to said folded position.

2. The seat of claim 1 wherein said guide means is a guide ramp and said portion of said connecting bar is a roller movable along said ramp.

3. The seat of claim 2 wherein said ramp descends toward said second axis and includes a portion forming a housing which holds said roller when said seat is in said normal position.

4. The seat of claim 1 or 2 or 3 wherein said portion of said connecting bar is on said fourth axis.

* * * * *